US009807927B2

(12) United States Patent
Klotzbach

(10) Patent No.: US 9,807,927 B2
(45) Date of Patent: Nov. 7, 2017

(54) OVERLAPPING SICKLE SECTION FOR A KNIFE ASSEMBLY

(71) Applicant: CNH America LLC, New Holland, PA (US)

(72) Inventor: Karl William Klotzbach, Muskego, WI (US)

(73) Assignee: CNH Industrial America LLC, New Holland, PA (US)

( * ) Notice: Subject to any disclaimer, the term of this patent is extended or adjusted under 35 U.S.C. 154(b) by 678 days.

(21) Appl. No.: 14/096,142

(22) Filed: Dec. 4, 2013

(65) Prior Publication Data

US 2015/0150190 A1    Jun. 4, 2015

(51) Int. Cl.
*A01D 34/13* (2006.01)
*A01D 34/14* (2006.01)

(52) U.S. Cl.
CPC .................... *A01D 34/14* (2013.01)

(58) Field of Classification Search
CPC ........ A01D 34/13; A01D 34/63; A01D 34/73; A01D 34/145; A01D 34/733; A01D 34/661; A01D 34/14
USPC .................................................. 56/299, 300
See application file for complete search history.

(56) References Cited

U.S. PATENT DOCUMENTS

| 105,550 | A | * | 7/1870 | Deevy | A01D 34/833 |
| | | | | | 30/274 |
| 235,855 | A | * | 12/1880 | Connel | A01D 34/13 |
| | | | | | 56/298 |
| 329,696 | A | | 11/1885 | Barnes | |
| 357,512 | A | * | 2/1887 | Van Den Bosch | 56/300 |
| 457,379 | A | * | 8/1891 | Shults | 56/299 |
| 531,987 | A | | 1/1895 | Wiseman | |
| 552,665 | A | * | 1/1896 | Miller | 56/299 |
| 726,392 | A | * | 4/1903 | Bailey | 56/291 |
| 750,943 | A | * | 2/1904 | Brown | 56/299 |
| 1,148,153 | A | * | 7/1915 | Dennewitz | A01D 34/833 |
| | | | | | 56/291 |
| 1,164,691 | A | | 12/1915 | Wilson | |
| 1,340,868 | A | | 5/1920 | Aidlotte | |
| 2,009,339 | A | * | 7/1935 | Davis | 56/300 |
| 2,217,741 | A | | 10/1940 | Gillette | |
| 2,716,324 | A | | 8/1955 | Miller | |
| 4,805,390 | A | | 2/1989 | Majkrzak | |
| 5,040,363 | A | | 8/1991 | Limburg et al. | |

(Continued)

*Primary Examiner* — Thomas B Will
*Assistant Examiner* — Mai Nguyen
(74) *Attorney, Agent, or Firm* — Peter K. Zacharias; Patrick M. Sheldrake

(57) ABSTRACT

An improved knife assembly for use with a header of an agricultural harvester. The assembly includes a knife head, a knife back and a plurality of sickle sections fastened to the knife head and knife back. The sickle sections include first and second portions where a second portion of one knife section overlaps a first portion of an another sickle section when the knife sections are arranged in adjacent relationship. The overlapping areas of the adjacent knife sections include aligned though holes which shared fasteners. The resultant construction reduces the overall knife assembly mass thereby leading to increased cutting speeds and corresponding harvester ground speeds. Additionally, the time and labor associated with manufacture and maintenance is reduced while the assembly strength and force distribution capability is enhanced.

17 Claims, 9 Drawing Sheets

(56) References Cited

U.S. PATENT DOCUMENTS

| | | |
|---|---|---|
| RE34,225 E | 4/1993 | Majkrzak |
| 6,886,316 B2 | 5/2005 | Schumacher |
| 8,151,547 B2 | 4/2012 | Bich et al. |
| 8,371,096 B2 | 2/2013 | Johnson et al. |
| 2013/0247531 A1* | 9/2013 | Campione .............. A01D 34/73 56/295 |

* cited by examiner

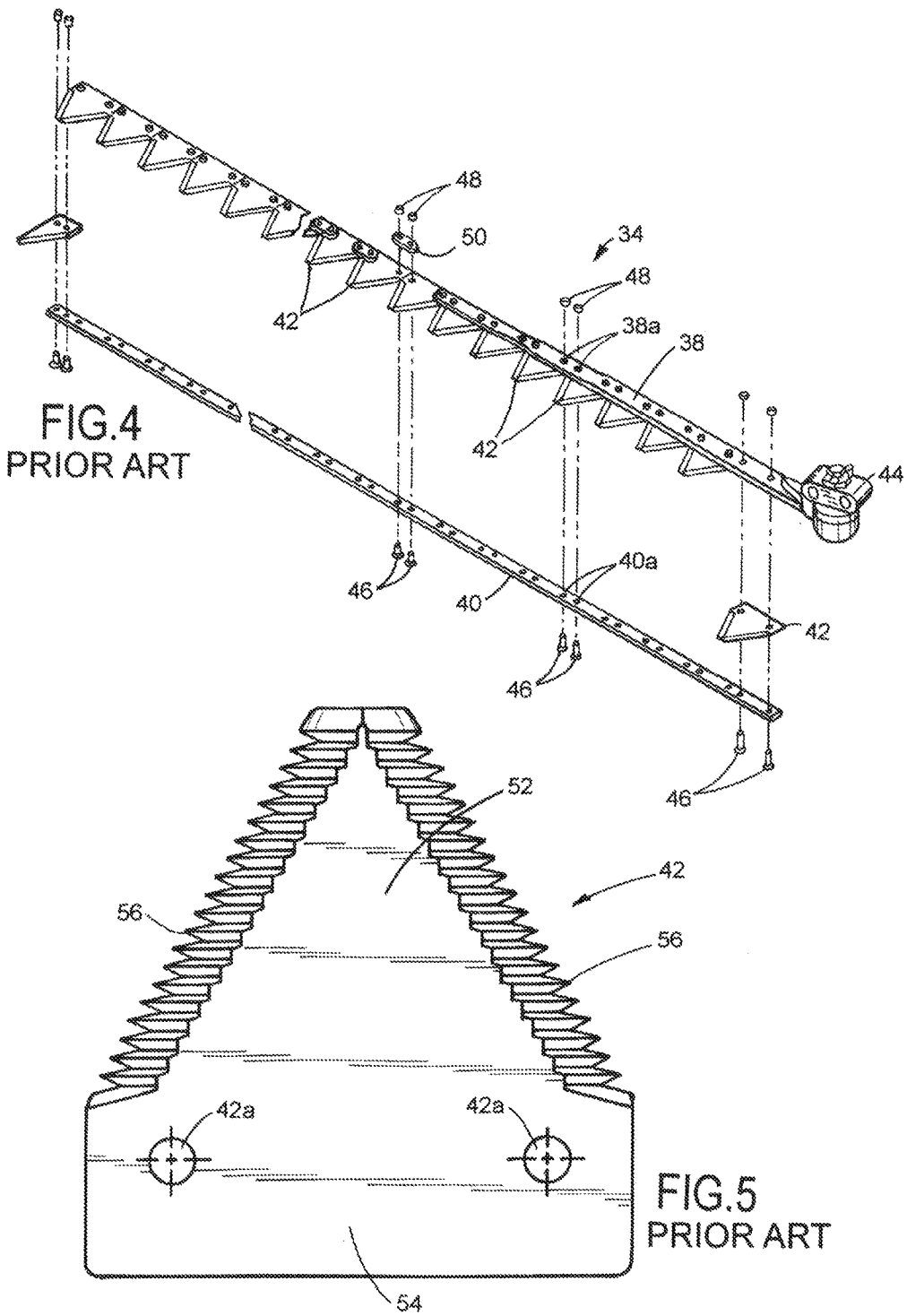

OVERLAPPING SICKLE SECTION FOR A KNIFE ASSEMBLY

BACKGROUND

The subject application relates generally to headers for agricultural harvesters. In particular, the subject application relates to a header including an improved cutting knife assembly having overlapping sickle sections.

Agricultural harvesters such as combine harvesters are well known apparatuses for harvesting grain crops. An agricultural harvester is typically a self-propelled vehicle which includes a feederhouse and mechanisms downstream of the feederhouse for separating grain from other crop material. A header is attached to the front of the harvester and includes mechanisms for cutting crop, gathering crop and delivering crop to the harvester's feederhouse. A typical crop cutter includes a stationary knife and a reciprocating knife which together act as shears that cut crop near the ground. After cutting, the crop is gathered e.g., by a harvesting reel which feeds the cut crop to a conveyor system that transports the cut crop to the harvester's feederhouse.

Typical reciprocating knife assemblies include knife blades formed from a plurality of sickle sections which are bolted to a knife back, some of which are also bolted to a knife head. In the event a sickle section becomes dulled or damaged and requires replacement, the affected section is unbolted and replaced by a new section. However, such repair can be time consuming and labor intensive, especially if several sickle sections require replacement. This is because conventional sickle sections each require two or more fasteners to secure the sickle sections to the underlying knife back and possibly the knife head.

Still further, the many fasteners required to secure the sickle sections to the knife back and knife head add an undesirable number of components and additional mass to the assembly. This is problematic in the sense that the more massive the knife assembly the more energy is required to propel the reciprocating blade in one direction then stop the blade and propel it in the opposite direction. Consequently, excessive mass combined with changes in velocity (acceleration/deceleration cycles) at each end of the knife stroke detrimentally affects knife speed which, in turn, introduces vibration and can result in slower cutting, slower combine ground speed and less than optimal harvesting productivity, while the increased number of components adds to manufacturing and maintenance complexity.

BRIEF SUMMARY

In accordance with a first aspect, the subject application provides a sickle knife assembly for use with a header of an agricultural harvester. The assembly addresses the problems of lengthy repair time and unnecessary apparatus mass by virtue of a robust yet simple construction. The subject application is directed to a knife or sickle assembly that uses overlapping sickle sections to reduce the number of fasteners required to assemble and repair the apparatus. Such reduction in the number of fasteners translates to faster repair time in that fewer fasteners need to be removed and replaced during a maintenance procedure. The considerable reduction in the number of fasteners also reduces the overall mass of the knife assembly. As a result, the knife assembly may cut crop at higher speeds and the harvester may be driven at correspondingly higher ground speeds thereby increasing harvesting efficiency and productivity.

In accordance with a second aspect, the subject application provides a sickle section for use in a knife assembly having a plurality of sickle sections disposed in adjacent relationship. The sickle section includes a first portion lying in a first plane, and a second portion lying in a second plane spaced from the first plane and connected to the first portion. The first portion includes a crop cutting region and a knife back attachment region distal from the crop cutting region. The second portion overlaps with an adjacently positioned sickle section.

In accordance with a third aspect, the subject application provides a knife assembly for use with a header of an agricultural harvester. The knife assembly includes a knife back and first and second sickle sections mounted on the knife back. Each of the first and second sickle sections includes a first portion lying in a first plane, and a second portion lying in a second plane spaced from the first plane and connected to the first portion. The first portion includes a crop cutting region and a knife back attachment region distal from the crop cutting region. The first sickle section is mounted on the knife back adjacent the second sickle section and the second portion of the first sickle section overlaps the second sickle section.

In accordance with a fourth aspect, the subject application provides a knife assembly for use with a header of an agricultural harvester. The knife assembly includes an elongated knife back and first and second sickle sections adjacently mounted on the knife back. The first and second sickle sections include a first portion lying in a first plane. The first sickle section further includes a second portion lying in a second plane spaced from the first plane and connected to the first portion. The first portion of the first sickle section includes a crop cutting region and a knife back attachment region for attaching the first sickle section to the elongated knife back. The first portion of the second sickle section includes a crop cutting region and a knife back attachment region for attaching the second sickle section to the elongated knife back. When mounted to the knife back, the second portion of the first sickle section overlaps a portion of the knife back attachment region of the second sickle section.

BRIEF DESCRIPTION OF THE SEVERAL VIEWS OF THE DRAWINGS

The foregoing summary, as well as the following detailed description of several aspects of the subject application, will be better understood when read in conjunction with the appended drawings. For the purpose of illustrating the subject application there are shown in the drawings several aspects, but it should be understood that the subject application is not limited to the precise arrangements and instrumentalities shown.

In the drawings:

FIG. 4 is an exploded view of the knife assembly of FIG. 2;

FIG. 5 is an enlarged top plan view of a conventional sickle section for use in the knife assembly of FIGS. 2-4;

DETAILED DESCRIPTION

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

Figure 1:
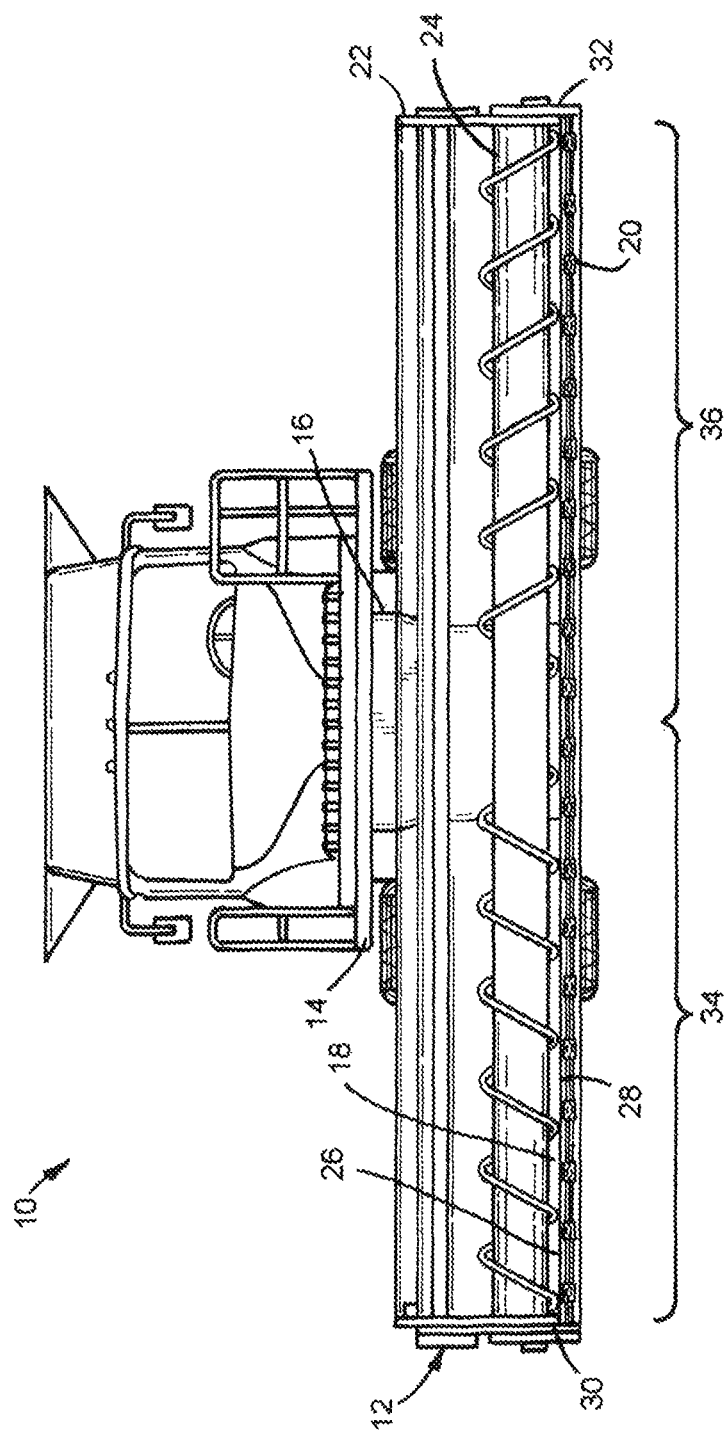
FIG. 1 is front elevation view of a conventional agricultural harvester including a header.

Referring now to the drawings, wherein aspects of the subject application are shown, FIG. 1 illustrates an agricultural harvester 10 such as a combine. Harvester 10 includes a header 12 which is attached to a forward end 14 of the harvester and which is configured to cut crops and to induct the cut crops into a feederhouse 16 as harvester 10 moves forward over a crop field.

Header 12 includes a floor 18 that is supported in desired proximity to the surface of a crop field and an elongate sickle assembly 20 that extends transversely along a forward edge of the floor 18. Sickle assembly 20 is configured to cut crops in preparation for induction into the feederhouse 16. Additionally, header 12 includes an elongate, transversely extending harvesting reel 22 disposed above sickle 20. Harvesting reel 22 is rotatable in a direction suitable for facilitating the induction of cut crops into feederhouse 16. Header 12 further includes an elongate, rotatable auger 24 which extends in close proximity to a top surface 26 of floor 18. Auger 24 is configured to cooperate with harvesting reel 22 in conveying cut crops to feederhouse 16, which is configured to convey the cut crops into harvester 10 for threshing and cleaning. While the foregoing aspect of the subject application is being described with respect to a draper header, the knife assembly of the subject application can be applied to any other header having use for a knife assembly or sickle section.

Sickle assembly 20 extends along a forward edge 28 of floor 18, and generally is bounded by a first side edge 30 and an opposing second side edge 32 of floor 18. Sickle assembly 20 can be configured to include a first reciprocating knife assembly 34 and a second reciprocating knife assembly 36 (along with an unillustrated stationary knife). The reciprocating mechanisms of such knife assemblies are known in the art and a further detailed description of their structure, function and operation is not necessary for a complete understanding of the subject application. However, a typical reciprocating mechanism applicable to the knife assembly of the subject application is disclosed in U.S. Pat. No. 8,151,547, the entire disclosure of which is incorporated by reference herein. The structural details of knife assembly 34 are illustrated in greater detail in conjunction with FIGS. 2-6 and it will be understood that knife assembly 36 is structurally similar or identical to knife assembly 34.

Referring to FIGS. 2-4 and 6, it will be seen that knife assembly 34 includes a knife head 38 (shown enlarged in FIG. 6), a knife back 40 and a plurality of sickle sections 42 connected to the knife back. A series of sickle sections is also disposed between the knife head and knife back. As is known, a proximal end of the knife head 38 is attached to a reciprocating driver element 44 which in turn is driven by an unillustrated motor which imparts reciprocating motion to the knife assembly 34. A plurality of fasteners such as bolts 46 (FIGS. 3 and 4) and nuts 48 (FIGS. 2-4) unite the knife head 38, knife back 40 and sickle sections 42. More particularly, the knife head 38, knife back 40 and sickle sections 42 have aligned through holes 38a, 40a and 42a, through which bolts 46 pass to threadedly engage with nuts 48.

Figure 2:
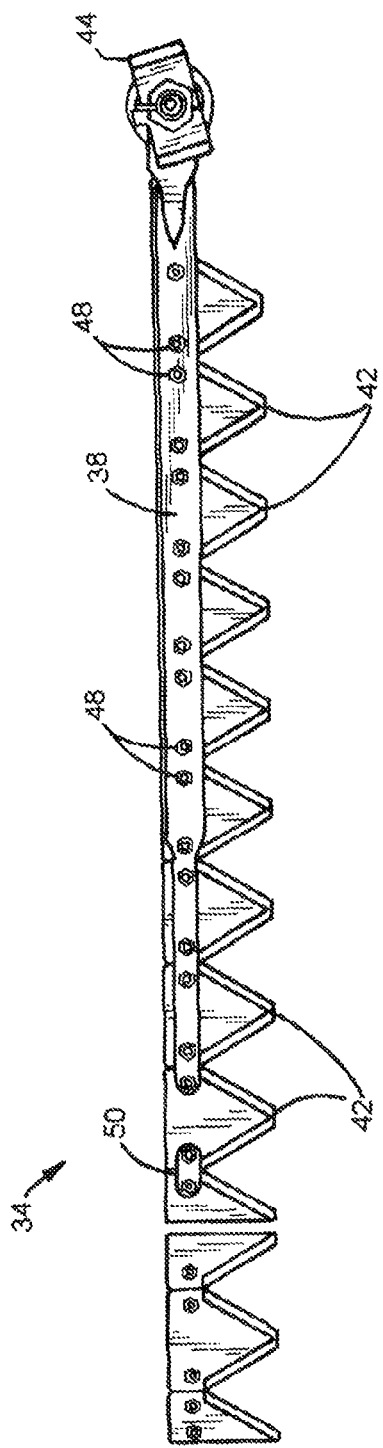
FIG. 2 is a top plan view of a conventional knife assembly for use in the header of FIG. 1.
Figure 3:
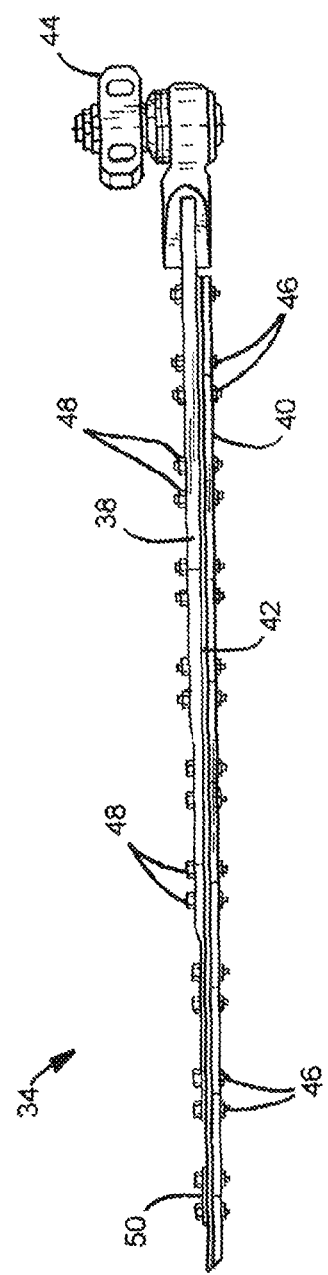
FIG. 3 is a front elevation view of the knife assembly of FIG. 2.
Figure 6:
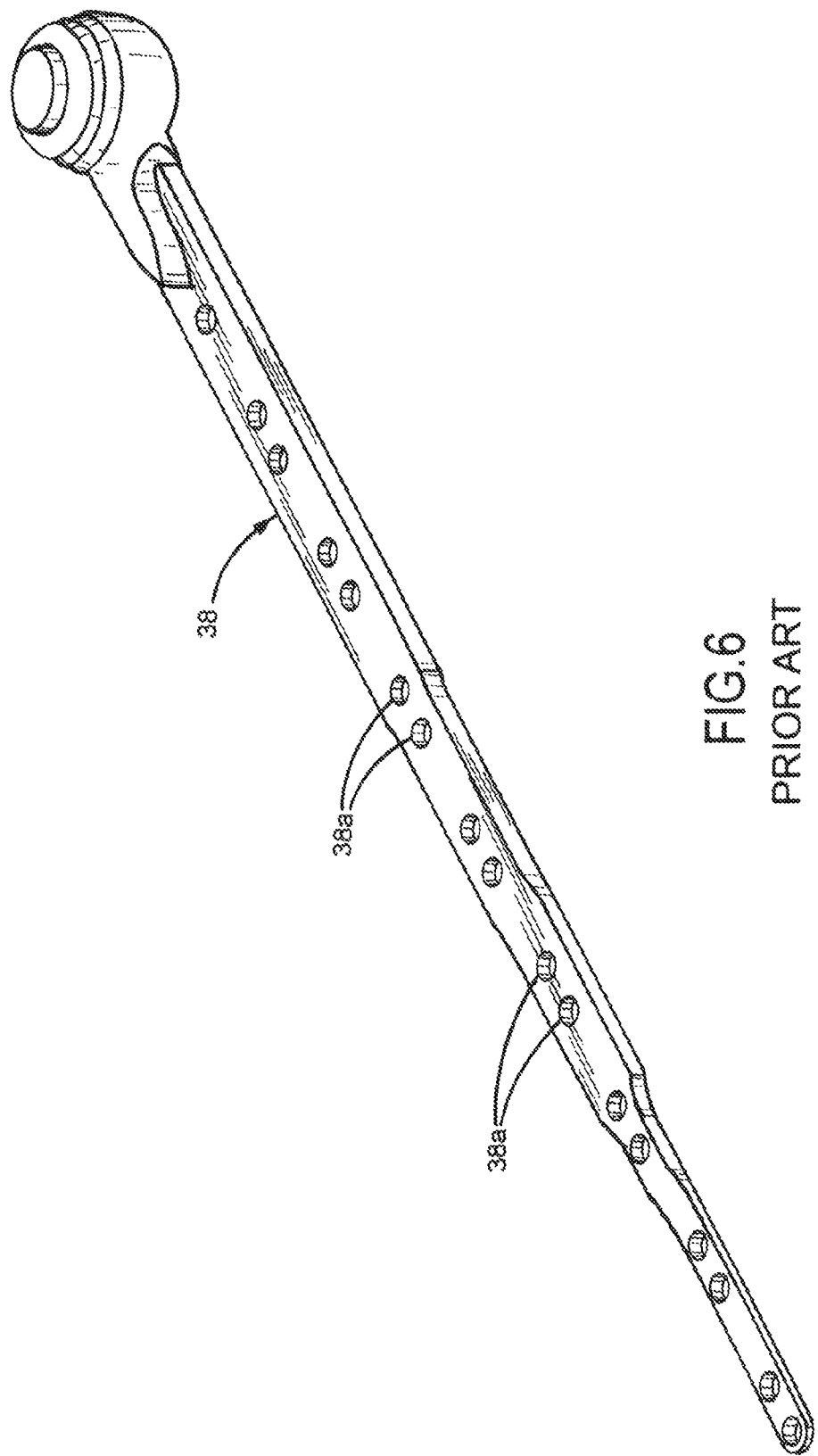
FIG. 6 is an enlarged perspective view of a knife head of the knife assembly of FIGS. 2-4.

As seen in FIGS. 2-4, knife head 38 does not extend the entire length of knife back 40 since the knife head need only span several but not all of the sickle sections 42 in order to impart structural rigidity to the knife assembly 34. However, in order to assure secure attachment of the sickle sections 42 to the knife back 40 in regions beyond the reach of knife head 38, it is common for a typical cutting head assembly to include spanner plates 50 which bridge the upper surfaces of adjacent sickle sections 42. The spanner plates 50 are secured to the sickle sections and underlying knife back by bolts and nuts 46, 48.

Referring to FIG. 5 there is shown on an enlarged scale a conventional sickle section 42. As seen in FIG. 5, sickle section 42 includes a crop cutting region 52 and a knife back attachment region 54. Crop cutting region 52 is generally triangular in shape and includes serrated edges 56 while knife back attachment region 54 includes a pair of through holes 42a through which bolts 46 pass to secure the sickle section to the knife back 40 as well as the knife head 38. The sickle section 42 is also configured as a planar element with the crop cutting region and knife back attachment region lying on the same plane. Moreover, when assembled to the knife back 40, each sickle section 42 lays in side by side relation to each other all along a single plane parallel to the plane of the knife back 40.

FIGS. 7-11 depict aspects of a knife assembly according to the subject application. The knife assembly 134 is adapted for use with a header of an agricultural harvester and includes a plurality of sickle sections constructed as described below.

Figure 7:
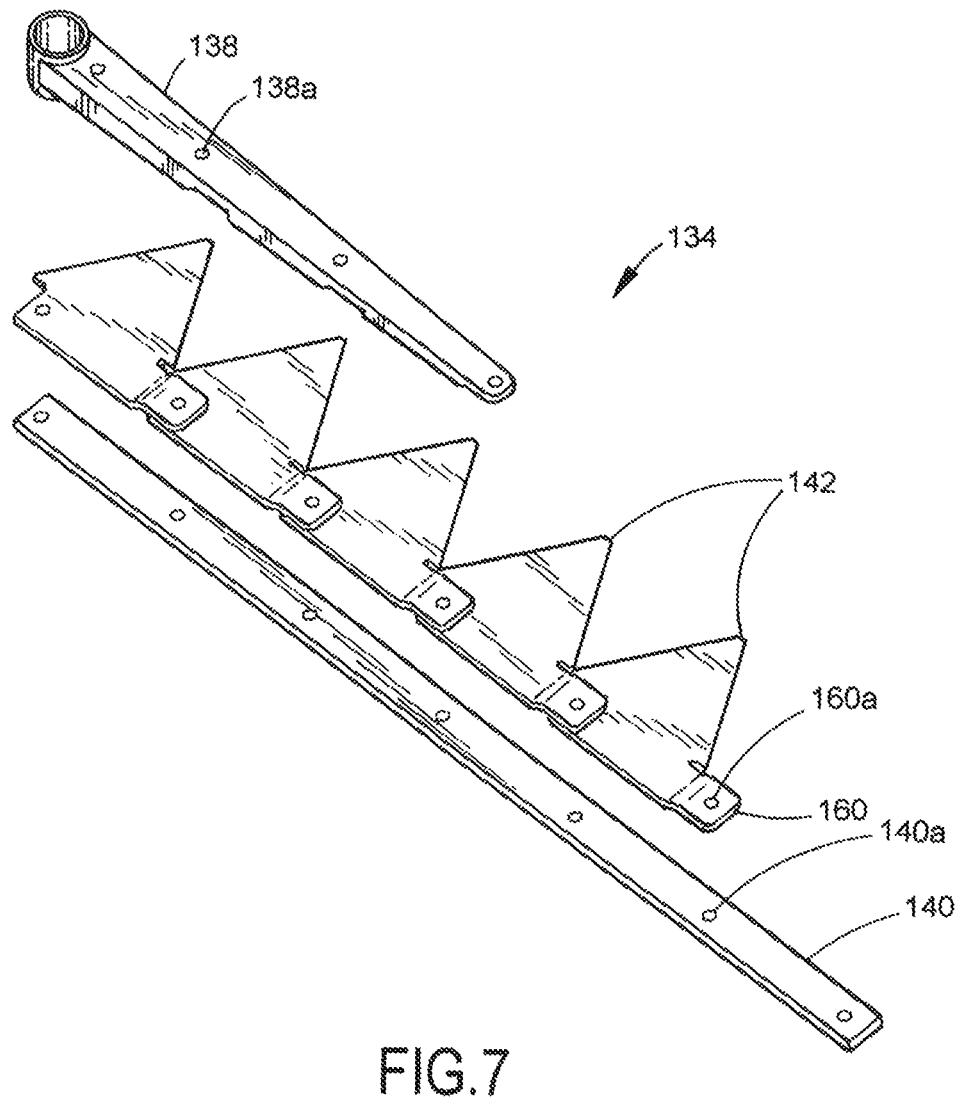
FIG. 7 is an exploded perspective view of a knife assembly according to an aspect of the subject application.
Figure 8:
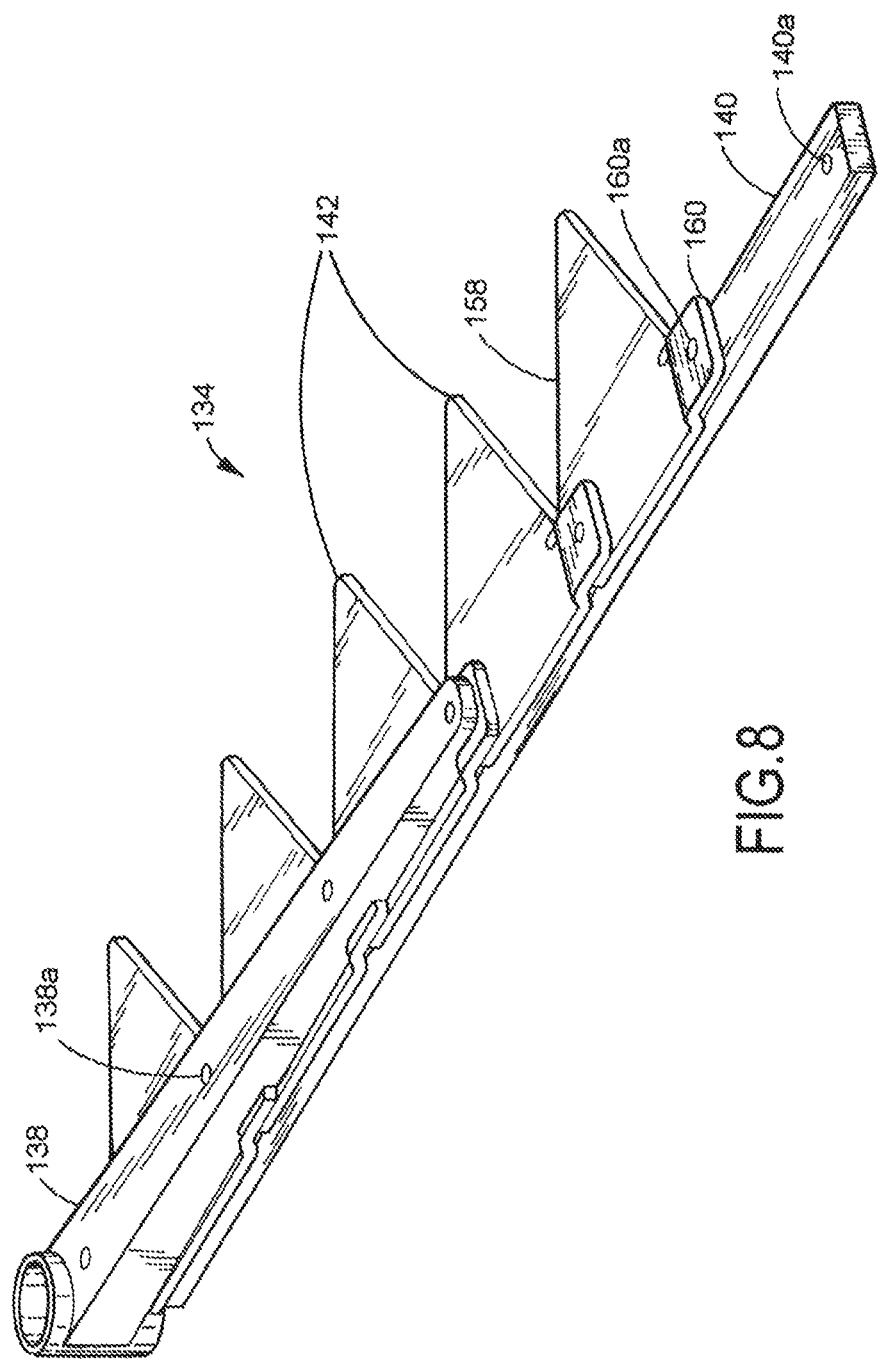
FIG. 8 is an assembled perspective view of the knife assembly of FIG. 7.

Turning first to FIGS. 7 and 8, there is shown in exploded and assembled view, respectively, a knife assembly 134 in accordance with the subject application. The knife assembly 134 includes a knife head 138 (shown enlarged in FIG. 11), a knife back 140 and a plurality of sickle sections 142 (shown enlarged in FIG. 9) that attach to the knife back. Knife back 140 is an elongated member configured with a plurality of spaced apart through holes 140a. Similarly, knife head 138 is also somewhat elongated and includes a plurality of spaced apart through holes 138a. As described below, the knife head 138, knife back 140 and sickle sections 142 can be united by plugs or other fasteners such as nuts and bolts in a manner similar to that described above in connection with cutting knife assembly 34.

Figure 9:
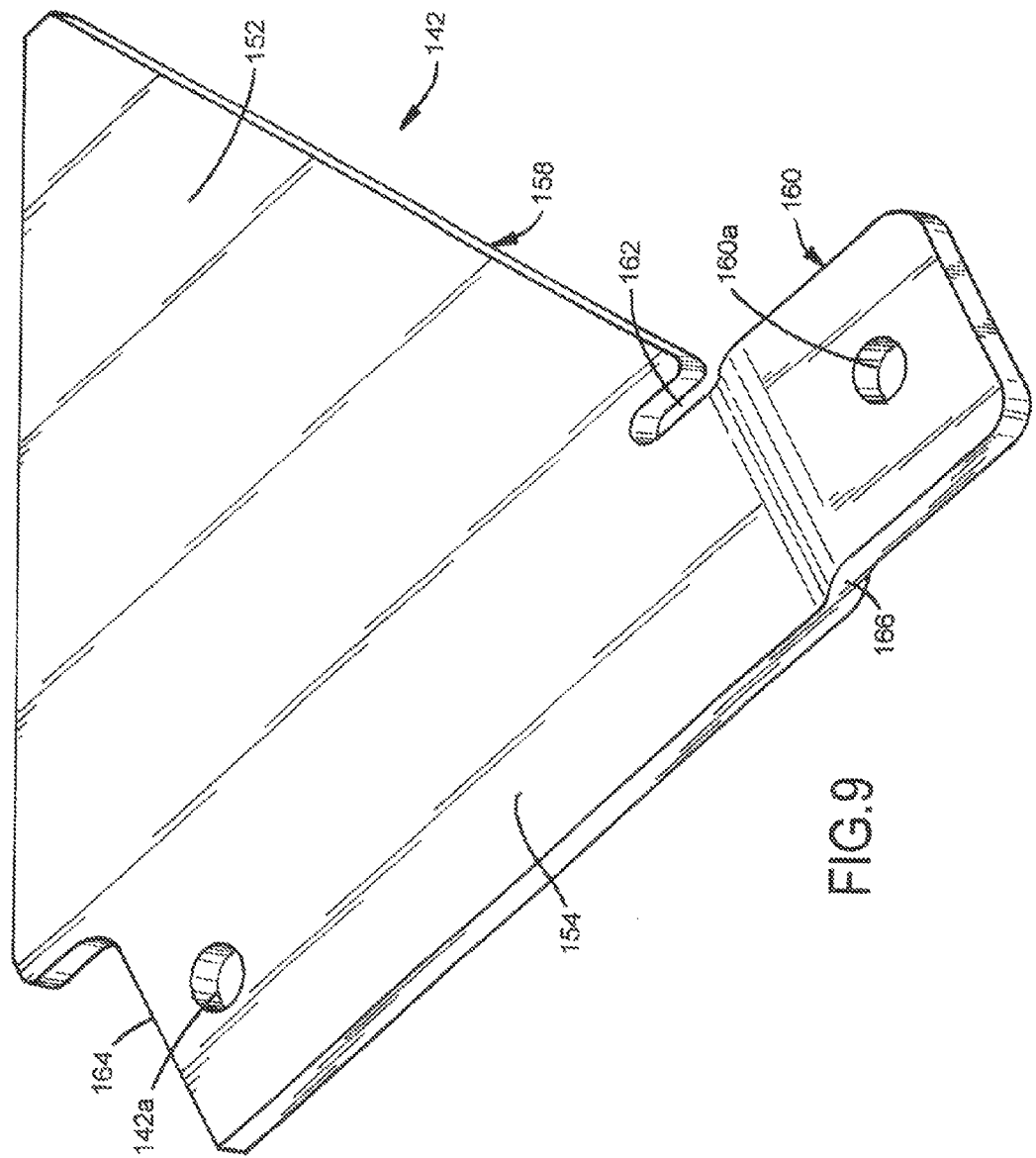
FIG. 9 is an enlarged perspective view of a sickle section of the knife assembly of FIG. 7.

Referring to FIG. 9 there is shown on an enlarged scale a sickle section 142 constructed according to an aspect of the subject application. Sickle section 142 can be die or laser cut, forged or machined and includes a first portion 158 lying in a first plane. The first portion 158 includes a crop cutting region 152 and a knife back attachment region 154 distal from the crop cutting region. Sickle section 142 further includes a second portion or tongue 160 connected to the first portion 158 and lying in a second plane spaced from the first plane. The second portion 160 is connected to the knife back attachment region 154 of the first portion 158 and is adjacent to the knife back attachment region and distal from the crop cutting region 152.

The second portion 160 is configured to overlap with an adjacently positioned sickle section in a manner described below. According to an aspect of the subject application, the second plane of the second portion 160 is spaced from and substantially parallel to the first plane of the first portion 158. The offset of the second portion 160 relative to the first portion 158 or the offset of the first plane from the second plane is equal or substantially equal to a thickness of the first portion.

For example, the second portion 160 is connected to the first portion 158 in a stair-like fashion or configuration. The stair-like structure of the first and second portions 158, 160 have a rise that is equal to a planar thickness of an individual sickle section e.g., the flight of the step defined by the first and second portions 158, 160 can be deemed to have a thickness of an individual sickle section. The stair structure of the first and second portions 158, 160 is best shown in FIG. 10.

The knife back attachment region 154 includes a first fastening portion 142a and the second portion 160 includes a second fastening portion 160a for a cooperative fastening application as described below. The first fastening portion 142a can be a first through hole 142a and the second fastening portion 160a can be a second through hole 160a.

Figure 10:
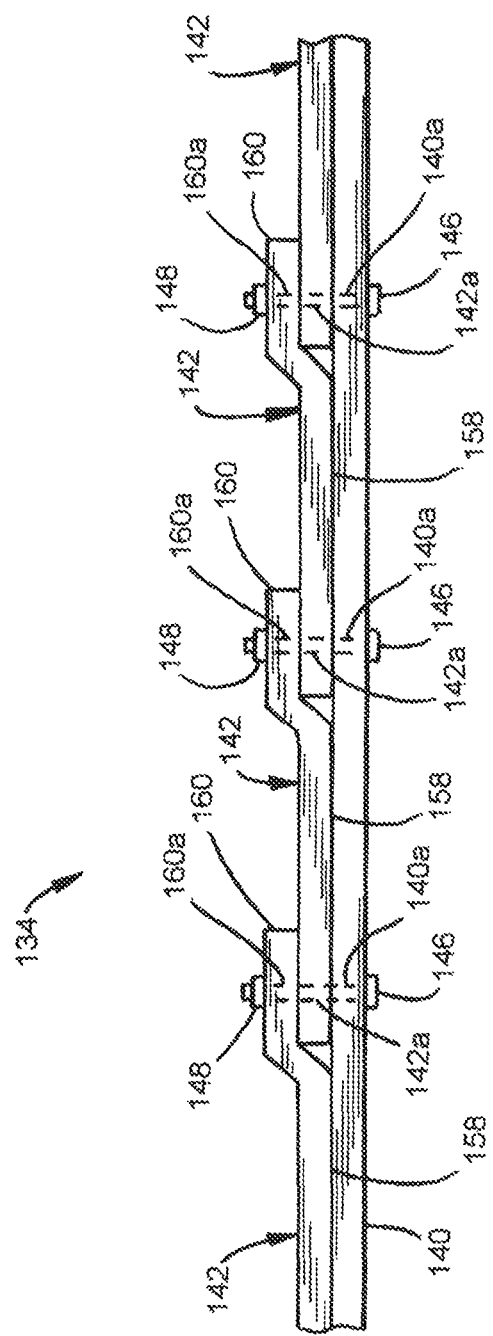
FIG. 10 is a partial side elevation view of several sickle sections of the knife assembly of FIG. 7.

Referring to FIGS. 7, 8 and 10, a plurality of sickle sections 142 are shown arranged in adjacent relationship. As most clearly seen in FIG. 10, when a plurality of sickle sections 142 are assembled and arranged in adjacent relationship, the second portion 160 of one sickle section overlaps the first portion 158 of an adjacent sickle section. Specifically the second portion 160 overlaps with the knife back attachment region 154 of the first portion. Further, the second through hole 160a of one sickle section aligns with the first through hole 142a of an adjacent sickle section. The aligned pair of the first and second through holes 142a, 160a is operable to share and receive a plug or other fastener such as a bolt 146 and a nut 148. Such a fastener is also shared with a through hole 140a of knife back 140 when the sickle sections are fastened to the knife back. Upon securing the fastener, the second portion 160 of a first sickle section is connected to the knife back attachment region 154 of an adjacent second sickle section. Thus, between adjacent first and second sickle sections, the knife back attachment region 154 of the second sickle section having a first fastening portion and the second portion 160 of the first sickle section having a second fastening portion form a cooperative fastening application for assembling the first and second sickle sections together.

As most clearly illustrated in FIG. 10, the knife assembly 134 defines an arrangement where adjacent sickle sections 142 are connected in chain-like fashion, e.g., a single fastener is used to secure two adjacent sickle sections to the knife back 140. Hence, the number of fasteners corresponds to the number of links in essentially a one-to-one relationship. This construction is quite unlike conventional designs where at least two fasteners are required to secure each sickle section to the knife back. The practical significance of the subject arrangement is that fewer fasteners are required to secure the sickle sections to the knife back, thereby resulting in a lower number of components, less overall knife assembly mass, and less time and labor required to assemble the apparatus as well as replace worn or damaged sickle sections. Moreover, the interconnected "chain" arrangement of the sickle sections 142 serves to effectively distribute transverse loads, i.e., loads that occur along the longitudinal axis of the knife back 140, among adjacent sickle sections. Additionally, the interconnected chain arrangement in combination with the sickle section second portion provides improved longitudinal stiffness or resistance to vertical flexure, therefore allowing for a less massive knife back than that which is presently employed in comparably sized knife assemblies.

Figure 11:
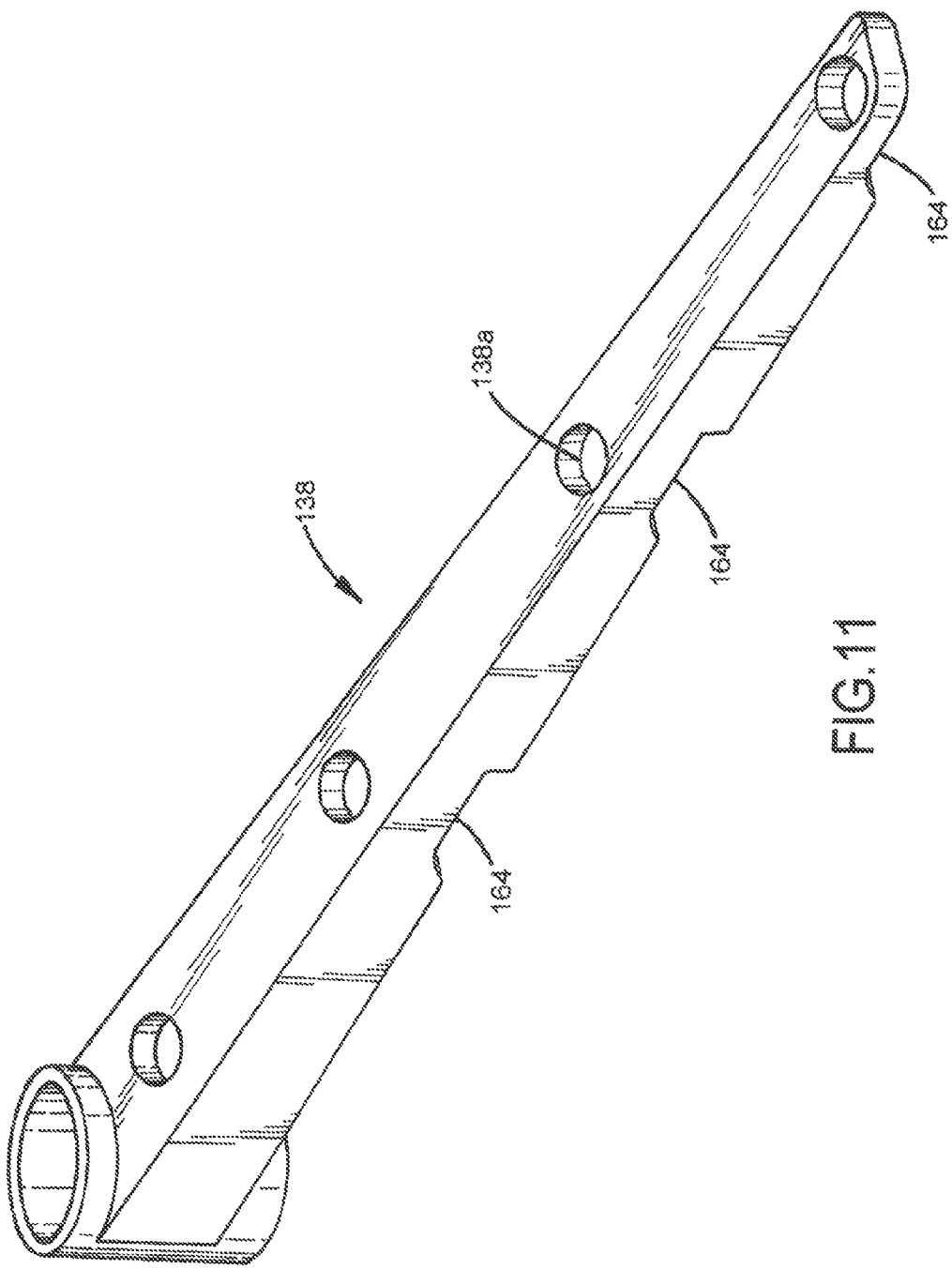
FIG. 11 is an enlarged perspective view of a knife head of the knife assembly of FIG. 7.

Referring to FIG. 11, there is shown the construction of the knife head 138. The knife head 138 includes a plurality of through holes 138a arranged for cooperative fastening alignment with the through holes of the sickle sections and the through holes of the knife back. Knife head 138 further includes a plurality of spaced apart recesses 164 on its underside for accommodating the second portions of sickle sections at locations where a second portion of one sickle section overlaps a first portion of an adjacent sickle section. So constructed, the knife head 138 closely follows the contours of the upper surfaces of the sickle sections in order to provide continuous and firm contact therewith in regions where the knife head, sickle sections and knife back are united. By closely following the contours of the upper surfaces of the sickle sections, the knife head provides a high degree of contact area between itself and the sickle sections which results in rigid and stiff knife assembly.

Referring back to FIG. 9, a notch 162 is provided at a juncture of the first and second portions 158, 160 of sickle section 142 and proximate the connection of the second portion to the first portion. Notch 162 is a stress relieving feature that also allows for increased flexibility of the second portion relative to the first portion. Further, the end opposite the notch end of the knife back attachment region 154 of sickle section 142 can be provided with a recessed area 164. Such recessed area is operable to accommodate a transition region 166 located between the first and second portions 158, 160 of an adjacent sickle section when the sickle sections are arranged in side by side relationship. The transition region 166 thus functions as a key that is matingly received in recessed area 164. The cooperating key and recess arrangement functions as a guide for aiding in assembly of the knife assembly while simultaneously adding strength to the overall knife assembly.

According to the subject application, the sickle sections 142 and resultant knife assembly 134 incorporating such sickle sections produces a robust yet comparatively less massive and more easily and quickly assembled and maintained assembly than heretofore known in the art. For example, the overlapping sickle sections require fewer fasteners than presently available sickle sections, thereby resulting in less time and labor to assemble at manufacture as well as when replacing worn or damaged sections. Additionally, the reduced number of fasteners results in lower overall assembly mass which in turn leads to higher cutter reciprocation speed, higher harvester ground speed and improved harvesting efficiency and productivity. Further, the chain-like overlapping nature of the sickle sections distributes transverse loads more effectively than conventional arrangements where adjacent sickle sections lie in simple abutting relationship. Furthermore, owing to its design the interconnected sickle sections are longitudinally stiffer than conventional side-by-side sickle section designs. Accordingly, in relation to comparable existing designs, a less massive knife back is required to achieve the same sickle section support capability. Still further, by virtue of its continuous contact with the contours of the overlapping sickle sections, the improved knife head design disclosed herein provides for improved overall assembly.

It will be appreciated by those skilled in the art that changes could be made to the aspects described above without departing from the broad inventive concept thereof. It is to be understood, therefore, that the subject application is not limited to the particular aspects disclosed, but it is intended to cover modifications within the spirit and scope of the subject application as defined by the appended claims.

I claim:

1. A sickle section for use in a knife assembly having a plurality of sickle sections disposed in adjacent relationship, the sickle section comprising:
   a first portion lying in a first plane, said first portion including:
      a crop cutting region; and
      a knife back attachment region distal from the crop cutting region;
   a second portion lying in a second plane spaced from said first plane and connected to the first portion about a first lateral side of the knife back attachment region; and
   an elongated notch at a juncture of the first portion and the second portion and proximate the connection of the second portion to the first portion, and
   wherein the knife back attachment region comprises an upwardly extending transition region connected to the second portion at the first lateral side of the knife back attachment region, and a recessed area about a second lateral side of the knife back attachment region opposite the first lateral side, the recessed area sized so as to be configured to receive an upwardly extending transition region of a knife back attachment region of a first adjacently positioned and identically shaped sickle section, and
   whereby the second portion is configured for overlapping a second adjacently positioned and identically shaped sickle section.

2. The sickle section of claim 1, wherein the second plane is substantially parallel to the first plane.

3. The sickle section of claim 1, wherein the knife back attachment region further includes a first fastening portion and the second portion includes a second fastening portion for a fastening application.

4. A knife assembly for use with a header of an agricultural harvester comprising:
   a knife back; and
   a first and a second sickle section mounted on the knife back, each of the first and second sickle sections including:
      a first portion lying in a first plane, the first portion including:
         a crop cutting region; and
         a knife back attachment region distal from the crop cutting region;
      a second portion lying in a second plane spaced from said first plane and connected to the first portion about a first lateral side of the knife back attachment region; and
      an elongated notch extending between the first portion and the second portion and proximate the connection of the second portion to the first portion for each of the first and second sickle sections,
      wherein the knife back attachment region includes:
         a recessed area about a second lateral side opposite the first lateral side, and
         an upwardly extending transition region connected to the second portion, and
   wherein the first sickle section is mounted on the knife back adjacent the second sickle section and the transition region of the first sickle section is received within the recessed area of the second sickle section.

5. The knife assembly of claim 4, wherein the second plane of each of the first and second sickle sections is substantially parallel to the first plane.

6. The knife assembly of claim 4, wherein the second portion of each of the first and second sickle sections is connected to the knife back attachment region of the first portion.

7. The knife assembly of claim 4, wherein the second portion of each of the first and second sickle sections is adjacent the knife back attachment region and distal from the crop cutting region.

8. The knife assembly of claim 4, wherein the knife back attachment region of the second sickle section includes a first fastening portion and the second portion of the first sickle section includes a second fastening portion for a cooperative fastening application with the first fastening position of the second sickle section.

9. The knife assembly of claim 8, wherein the first fastening portion is a through hole and the second fastening portion is a through hole.

10. The knife assembly of claim 9, further comprising a plug extending through the through holes of the first fastening portion of the second sickle section and the second fastening portion of the first sickle section.

11. A knife assembly for use with a header of an agricultural harvester comprising:
   an elongated knife back;
   a first sickle section mounted on the knife back, the first sickle section including:
      a first portion lying in a first plane, the first portion including:
         a crop cutting region; and
         a knife back attachment region for attaching the first sickle section to the elongated knife back;
      a second portion lying in a second plane spaced from said first plane and connected to the first portion about a first lateral side of the knife back attachment region, wherein the knife back attachment region includes an upwardly extending transition region connected to the second portion; and
      a notch at a juncture of the first portion and the second portion, and proximate the connection of the second portion to the first portion; and
   a second sickle section mounted on the knife back adjacent the first sickle section, the second sickle section including:
      a first portion lying in the first plane, the first portion including:
         a crop cutting region; and
         a knife back attachment region for attaching the second sickle section to the elongated knife back, wherein the knife back attachment region includes a recess about a second lateral side;
      a second portion lying in the second plane spaced from the first plane and connected to the first portion of the second sickle section about a first lateral side of the knife back attachment region of the first portion of the second sickle section; and a notch at a juncture of the first portion and the second portion of the second sickle section, and proximate the connection of the second portion to the first portion of the second sickle section, and wherein the second portion of the first sickle section overlaps a portion of the knife back attachment region of the second sickle section and the transition region of the first sickle section is received within the recess of the second sickle section.

12. The knife assembly of claim 11, wherein the second plane of each of the first and second sickle sections is substantially parallel to the first plane.

13. The knife assembly of claim 11, wherein the second portion of each of the first and second sickle sections is connected to the knife back attachment region of the first portion.

14. The knife assembly of claim 11, wherein the second portion of each of the first and second sickle sections is adjacent the knife back attachment region and distal from the crop cutting region.

15. The knife assembly of claim 11, wherein the knife back attachment region of the second sickle section includes a first fastening portion and the second portion of the first sickle section includes a second fastening portion for a cooperative fastening application with the first fastening portion of the second sickle section.

16. The sickle section of claim 1, wherein the transition region extends laterally beyond a lateral most end of the crop cutting region.

17. The knife assembly of claim 4, wherein the transition region extends laterally beyond a lateral most end of the crop cutting region.

\* \* \* \* \*